(12) United States Patent
Spitzenberger

(10) Patent No.: US 11,453,064 B2
(45) Date of Patent: Sep. 27, 2022

(54) CUTTING INSERT AND CUTTING TOOL

(71) Applicant: Kennametal Inc., Latrobe, PA (US)

(72) Inventor: Konrad Spitzenberger, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 219 days.

(21) Appl. No.: 17/011,192

(22) Filed: Sep. 3, 2020

(65) Prior Publication Data

US 2021/0069798 A1 Mar. 11, 2021

(30) Foreign Application Priority Data

Sep. 5, 2019 (DE) .......................... 102019123912.5

(51) Int. Cl.
  *B23C 5/06* (2006.01)
  *B23B 27/16* (2006.01)
  *B23C 5/20* (2006.01)

(52) U.S. Cl.
  CPC ... *B23B 27/1611* (2013.01); *B23B 2200/0438* (2013.01); *B23C 5/202* (2013.01); *B23C 2200/0422* (2013.01); *B23C 2200/083* (2013.01); *B23C 2200/123* (2013.01); *B23C 2200/208* (2013.01); *B23C 2200/24* (2013.01)

(58) Field of Classification Search
  CPC ......... B23B 2200/0438; B23B 27/1611; B23B 2200/123; B23B 2200/083; B23B 2200/203; B23B 2200/3627; B23B 2200/208; B23B 2200/24; B23C 2200/0422; B23C 2200/0405; B23C 2200/0455; B23C 2200/208; B23C 5/202; B23C 5/06; B23C 2200/0444; B23C 2210/0407
  See application file for complete search history.

(56) References Cited

U.S. PATENT DOCUMENTS

| 640,716 A | 1/1900 | Sui |
| 3,541,655 A | 11/1970 | Stier |
| 4,627,317 A | 12/1986 | Komanduri et al. |
| 4,971,483 A | 11/1990 | Kress et al. |

(Continued)

FOREIGN PATENT DOCUMENTS

| DE | 2533261 B2 | 10/1979 |
| DE | 402017100861001 | 9/2017 |

(Continued)

OTHER PUBLICATIONS

Seco Product ONEU090520ZZTN4-M14; Dec. 2015.

(Continued)

*Primary Examiner* — Sara Addisu
(74) *Attorney, Agent, or Firm* — Larry R. Meenan

(57) ABSTRACT

The invention relates to a cutting insert having a polygonal upper side. Cutting edges, which are alternately configured as roughing cutting edges and finishing cutting edges, are provided at the edges of the upper side. The finishing cutting edges define an incircle (K1) having a diameter that is enlarged in comparison to a nominal size of the cutting insert, and the roughing cutting edges define an incircle (K2) having a diameter that is reduced in comparison to the nominal size of the cutting insert. The invention further relates to a cutting tool having a tool body on which at least one such cutting insert is disposed.

15 Claims, 2 Drawing Sheets

(56) References Cited

U.S. PATENT DOCUMENTS

| | | | |
|---|---|---|---|
| 5,727,911 A * | 3/1998 | Satran | B23C 5/202 407/42 |
| 5,755,536 A | 5/1998 | Vollmer et al. | |
| 5,807,031 A * | 9/1998 | Arai | B23C 5/202 407/115 |
| 5,827,016 A * | 10/1998 | Strand | B23C 5/202 407/115 |
| 5,915,889 A | 6/1999 | Kress et al. | |
| 5,971,672 A | 10/1999 | Hansson | |
| 6,079,912 A | 6/2000 | Rothballer | |
| 6,164,878 A | 12/2000 | Satran et al. | |
| 6,196,770 B1 | 3/2001 | Astroem et al. | |
| 6,254,316 B1 | 7/2001 | Strand | |
| D460,768 S | 7/2002 | Svensson | |
| 6,503,028 B1 | 1/2003 | Wallström | |
| 6,607,335 B2 * | 8/2003 | Morgulis | B23C 5/202 407/116 |
| D482,706 S | 11/2003 | Svensson | |
| 6,641,337 B1 * | 11/2003 | Rothballer | B23B 27/143 407/116 |
| 6,769,844 B2 | 8/2004 | Waggle | |
| 7,220,083 B2 | 5/2007 | Festeau et al. | |
| 7,530,769 B2 | 5/2009 | Kress et al. | |
| D651,224 S | 12/2011 | Takahashi et al. | |
| 8,096,735 B2 | 1/2012 | Sladek et al. | |
| 8,858,131 B2 | 10/2014 | Scheicher | |
| 8,915,681 B2 | 12/2014 | Ishi | |
| D760,308 S | 6/2016 | Krishnegowda et al. | |
| 9,475,134 B2 | 10/2016 | Satran | |
| D772,963 S | 11/2016 | Nam et al. | |
| 9,776,258 B2 * | 10/2017 | Brunetto | B23C 5/06 |
| D804,552 S | 12/2017 | Lee et al. | |
| 10,058,936 B2 | 8/2018 | Kister | |
| 2002/0122699 A1 | 9/2002 | Noggle | |
| 2003/0021641 A1 * | 1/2003 | Nelson | B23C 5/202 407/35 |
| 2003/0180103 A1 * | 9/2003 | Nagaya | B23C 5/2213 407/34 |
| 2004/0007115 A1 | 1/2004 | Schwaner et al. | |
| 2005/0254908 A1 | 11/2005 | Norstrom et al. | |
| 2006/0210364 A1 | 9/2006 | Bellmann et al. | |
| 2007/0297865 A1 | 12/2007 | Hessman | |
| 2010/0221076 A1 * | 9/2010 | Takahashi | B23C 5/202 407/42 |
| 2011/0135407 A1 * | 6/2011 | Koga | B23C 5/202 407/103 |
| 2011/0150586 A1 * | 6/2011 | Fang | B23C 5/06 407/69 |
| 2011/0305535 A1 * | 12/2011 | Jansson | B23C 5/06 407/103 |
| 2012/0070240 A1 | 3/2012 | Ishi et al. | |
| 2012/0155976 A1 | 6/2012 | Ishi | |
| 2012/0189396 A1 * | 7/2012 | Xu | B23C 5/06 407/42 |
| 2013/0094913 A1 * | 4/2013 | Yoshida | B23C 5/202 407/100 |
| 2013/0129430 A1 * | 5/2013 | Bhagath | B23B 27/145 407/100 |
| 2013/0156515 A1 * | 6/2013 | Satran | B23C 5/202 407/113 |
| 2013/0336732 A1 * | 12/2013 | Jansson | B23C 5/06 407/113 |
| 2014/0010605 A1 | 1/2014 | Smilovici et al. | |
| 2014/0044496 A1 * | 2/2014 | Shankaregowda | B23C 5/202 407/107 |
| 2014/0341660 A1 | 11/2014 | Cheon | |
| 2015/0050092 A1 * | 2/2015 | Tanaka | B23B 27/145 407/100 |
| 2015/0071717 A1 | 3/2015 | Morrison et al. | |
| 2015/0098768 A1 * | 4/2015 | Morrison | B23B 27/145 407/114 |
| 2016/0082528 A1 | 3/2016 | Ballas | |
| 2016/0288224 A1 * | 10/2016 | Ishi | B23C 5/06 |
| 2017/0189972 A1 * | 7/2017 | Matsumura | B23C 5/06 |
| 2017/0225243 A1 * | 8/2017 | Matsumura | B23C 5/202 |
| 2017/0320145 A1 | 11/2017 | Pettersson et al. | |
| 2018/0009044 A1 | 1/2018 | Koifman et al. | |
| 2019/0283148 A1 | 9/2019 | Koike et al. | |
| 2019/0321898 A1 | 10/2019 | Eriksson et al. | |
| 2020/0376548 A1 * | 12/2020 | Sterkenburg | B23C 5/202 |
| 2021/0001417 A1 * | 1/2021 | Wuerfels | B23C 5/202 |

FOREIGN PATENT DOCUMENTS

| | | | |
|---|---|---|---|
| EP | 0084223 | | 1/1988 |
| JP | 2013176834 A * | 9/2013 | B23C 5/109 |
| JP | 2017071056 A * | 4/2017 | B23C 5/06 |
| WO | WO-2010110110 A1 * | 9/2010 | B23C 5/06 |
| WO | WO2016033620 A1 | 3/2016 | |

OTHER PUBLICATIONS

Iscar product OHNU 0806AN-R-W; Dec. 2015.
Ingersoll product ONCU090612TN-W J; Dec. 2015.
Jan. 5, 2022 Notice of Allowance P18-06335-US-NP—U.S. Appl. No. 16/915,084.
Aug. 26, 2021 Non-Final OA P18-06335-US-NP—U.S. Appl. No. 16/915,084.
Mar. 1, 2018 Notice of Allowance Chinese Design No. 201730358789.2.
Jun. 26, 2018 Notice of Allowance.

* cited by examiner

CUTTING INSERT AND CUTTING TOOL

RELATED APPLICATION DATA

The present application claims priority pursuant to 35 U.S.C. § 119(a) to German Patent Application Number 102019123912.5 filed Sep. 5, 2019, which is incorporated herein by reference in its entirety.

FIELD

The invention relates to cutting inserts, in particular for a milling tool employing cutting inserts.

BACKGROUND

Cutting inserts can have a polygonal upper side and a polygonal lower side, wherein the upper side and the lower side are congruent when viewed along a center axis of the cutting insert, with a number of lateral surfaces which corresponds to the number of corners of the upper side, wherein each of the lateral surfaces connects an edge of the upper side with an edge of the lower side that is adjacent along the center axis of the cutting insert, and with a number of cutting edges which corresponds to the number of corners of the upper side, wherein the cutting edges are provided on the edges of the upper side and are alternately configured as roughing cutting edges and finishing cutting edges.

Cutting tools, in particular a milling tool, can have a tool body on which at least one such cutting insert is disposed.

Such cutting inserts and cutting tools are known from the state of the art.

Such cutting inserts and cutting tools equipped with said cutting inserts are used to carry out both a roughing operation and a finishing operation in a single machining step. The cutting tools are therefore also referred to as roughing/finishing tools and the cutting inserts as roughing/finishing cutting inserts. In English, such cutting inserts are also referred to as wiper inserts. Cutting inserts with multiple cutting edges are also generally referred to as indexable inserts.

Thanks to the combined roughing and finishing of a workpiece, high metal removal rates can be combined with good surface quality on the cut surface. Workpieces can thus be machined quickly without having to accept any deterioration in the surface quality.

SUMMARY

The object of the invention then is to further improve such cutting inserts and associated cutting tools. The intent is in particular to create cutting inserts that are simple and inexpensive to produce and at the same time have a long service life, i.e. tool life.

The object is achieved by a cutting insert of the type mentioned above, in which the lateral surfaces are continuous along the center axis of the cutting insert, and in which the finishing cutting edges define an incircle having a diameter that is enlarged in comparison to a nominal size of the cutting insert, and the roughing cutting edges define an incircle having a diameter that is reduced in comparison to the nominal size of the cutting insert. The nominal size is the typical size specification for cutting inserts or indexable inserts. The cutting insert can have a nominal size of 20 mm, for example. The diameter of the incircle of the finishing cutting edges is then 20.15 mm, for example, and the incircle of the roughing cutting edges is 19.95 mm, for example.

Other exemplary nominal sizes are 10 mm and 16 mm. Configuring the lateral surfaces to be continuous makes the cutting edges, i.e. both the finishing cutting edges and the roughing cutting edges, particularly stable. In other words, the cutting insert is designed such that there is little risk of the cutting edges breaking or being damaged in any other way. This results in a long service life of the cutting insert, and consequently a long tool life. In this context, the lateral surfaces are in particular designed without steps. Because the lateral surfaces are continuous over the entire height of the cutting insert, the production of the cutting insert is simplified. In this context, for example, a periphery of the cutting insert can be ground in a single pass. This makes the production of the cutting insert particularly quick and easy.

In a preferred embodiment, the incircle of the finishing cutting edges is selected such that the finishing cutting edges project 0.02 mm to 0.06 mm beyond the roughing cutting edges when the cutting insert is in operation, i.e. when it is mounted in a cutting tool. This makes it possible to combine high metal removal rates with good surface quality.

The incircle of the roughing cutting edges is in particular selected such that the roughing cutting edges of the cutting insert can be positioned in a cutting tool in exactly the same way as the roughing cutting edges of a known, pure roughing cutting insert. The cutting insert is thus suitable for a so-called mixed placement. It can therefore be used in a cutting tool together with known, pure roughing cutting inserts.

According to one embodiment, cutting edges are also provided on the edges of the lower side, wherein the cutting edges are alternately configured as roughing cutting edges and finishing cutting edges and similar cutting edges are disposed adjacent to one another along the center axis of the cutting insert. The number of cutting edges thus corresponds to twice the number of corners of the cutting insert. The number of cutting edges is thus doubled compared to a cutting insert that has cutting edges only on its upper side. Such a cutting insert is consequently particularly economical to use.

The cutting edges configured as roughing cutting edges can be inclined, convex or concave with respect to the upper side or the lower side. The cutting edges disposed on the upper side are therefore inclined, convex or concave with respect to the upper side and the cutting edges disposed on the lower side are inclined, convex or concave with respect to the lower side. In this context, an inclined roughing cutting edge is a roughing cutting edge that is inclined with respect to the upper side or the lower side at an angle that is substantially constant over the entire extent of said cutting edge. Concave roughing cutting edges are furthermore roughing cutting edges that, starting from a first corner of the cutting insert delimiting them, initially fall in the direction of the center of the cutting insert and then rise again in the direction of a second corner delimiting them. Convex roughing cutting edges accordingly initially rise from a first corner of the cutting insert delimiting them and then fall again in the direction of a second corner delimiting them. Concave and convex roughing cutting edges can thus also be roughing cutting edges that are inclined at a variable angle. Making the roughing cutting edges inclined, concave or convex, allows a desired cutting behavior to easily be set. This in particular makes it possible to ensure uniform engagement on a workpiece to be machined. High machining quality and a high metal removal rate are thus guaranteed.

Alternatively or additionally, the cutting edges configured as finishing cutting edges are inclined, convex or concave with respect to the upper side or the lower side. The cutting edges disposed on the upper side are therefore inclined, convex or concave with respect to the upper side and the cutting edges disposed on the lower side are inclined, convex or concave with respect to the lower side. The terms inclined, convex and concave are the same as for the roughing cutting edges. The inclination of the cutting edges ensures uniform engagement of said cutting edges on a workpiece to be machined when the cutting insert is used in a cutting tool. The effective rake angle can thus be set to a constant value. High machining quality and a high metal removal rate are thus guaranteed.

At least in sections, the cutting edges configured as roughing cutting edges and/or the cutting edges configured as finishing cutting edges can be inclined at an angle of 3° to 20°, in particular at an angle of 5° to 15°, relative to the upper side or the lower side. When using the cutting inserts in standard cutting tools, such angles of inclination produce a good compromise between machining quality and metal removal rate. The abovementioned angle specifications for inclined cutting edges are constant angles of inclination. Convex or concave cutting edges extend at the aforementioned angles only in sections.

According to one variant, a connecting edge, which continuously connects adjacent cutting edges, is provided on the upper side and the lower side in each corner region of the cutting insert. Any offset of the cutting edges on the periphery of the cutting insert is thus compensated for by the connecting edges. This results in a continuous edge of the cutting insert. The cutting insert is consequently easy to produce.

In one embodiment, the cutting edges configured as finishing cutting edges are more inclined than the cutting edges configured as roughing cutting edges. A high metal removal rate can thus be combined with high surface quality after machining.

The lateral surfaces which are associated with the finishing cutting edges are advantageously abutment surfaces for abutment of the cutting insert against a tool body. The cutting insert can thus be positioned on a tool body in a defined manner. This makes it possible to achieve precise machining results.

The lateral surfaces can furthermore be free surfaces of the adjacent cutting edges. The associated rake faces are therefore disposed in the area of the upper side and the lower side. This makes the design of the cutting insert particularly simple.

The cutting insert preferably comprises an even number of corners, in particular four, six or eight corners.

The object is further achieved by a cutting tool of the abovementioned type, which is equipped with a cutting insert according to the invention. The cutting tool is in particular a milling tool. The cutting insert according to the invention can be supplemented with conventional cutting inserts. These can be pure roughing cutting inserts. According to its preferred embodiment, such a cutting tool thus comprises one or two cutting inserts according to the invention and otherwise conventional cutting inserts. In this way, high metal removal rates can be combined with a high-quality machining result. Designing the cutting inserts according to the invention also makes it possible to configure the effective rake angles such that they are substantially the same over the entire tool. For this purpose, in terms of its inclination, convexity or concavity, the roughing cutting edge of the cutting inserts according to the invention is usually designed in the same way as the main cutting edges of the conventional cutting inserts. Generally speaking, therefore, the roughing cutting edges of the cutting insert according to the invention are positioned in the cutting tool in exactly the same way as the roughing cutting edges of conventional cutting inserts.

Preferably, at least one lateral surface of the cutting insert associated with one of the finishing cutting edges abuts a counter-abutment surface of the tool body. The cutting insert is thus reliably and precisely positioned on the tool body. This results in a precise work product.

BRIEF DESCRIPTION OF THE DRAWINGS

The invention is explained below with the aid of a design example, which is shown in the accompanying drawings. The figures show.

DETAILED DESCRIPTION

Figure 1:
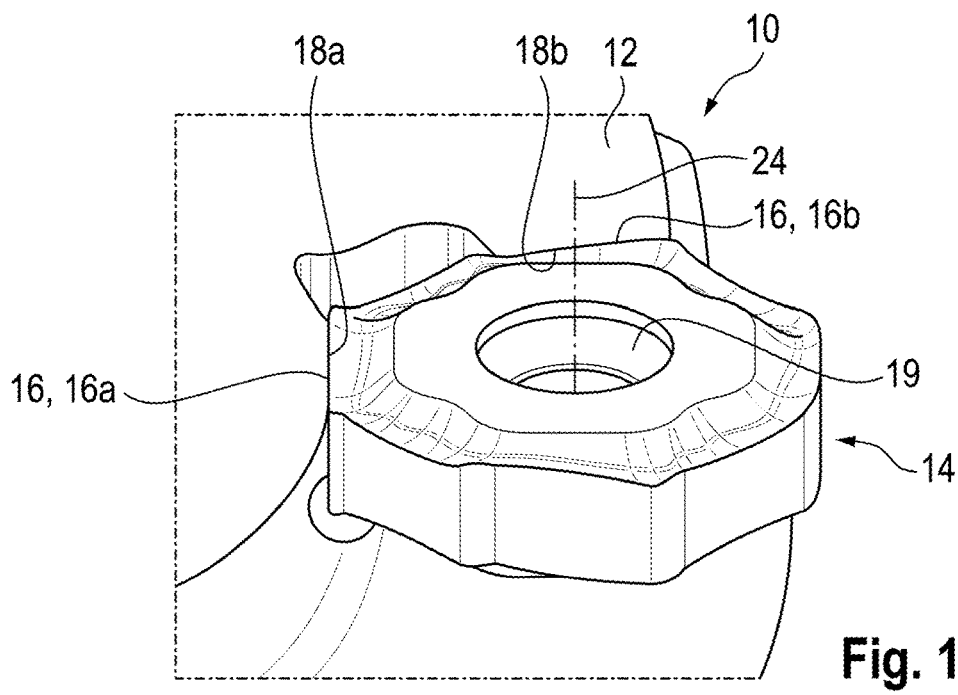
FIG. 1 a cutting tool according to the invention with a cutting insert according to the invention, wherein the cutting tool is shown only in sections, FIG. 2 the cutting insert according to the invention of FIG. 1 in a plan view, FIG. 3 an enlarged section III of the cutting insert of FIG. 2, and FIG. 4 the cutting insert of FIGS. 1 to 3 in a lateral view.
Figure 2:
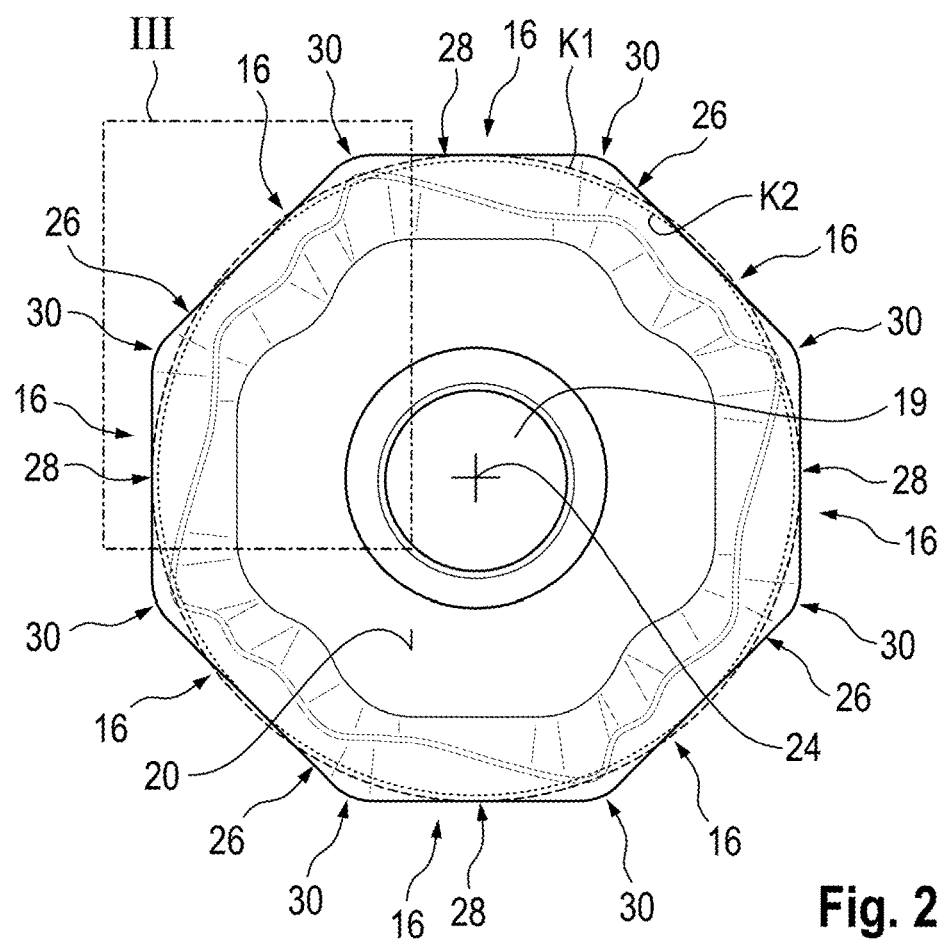
Figure 3:
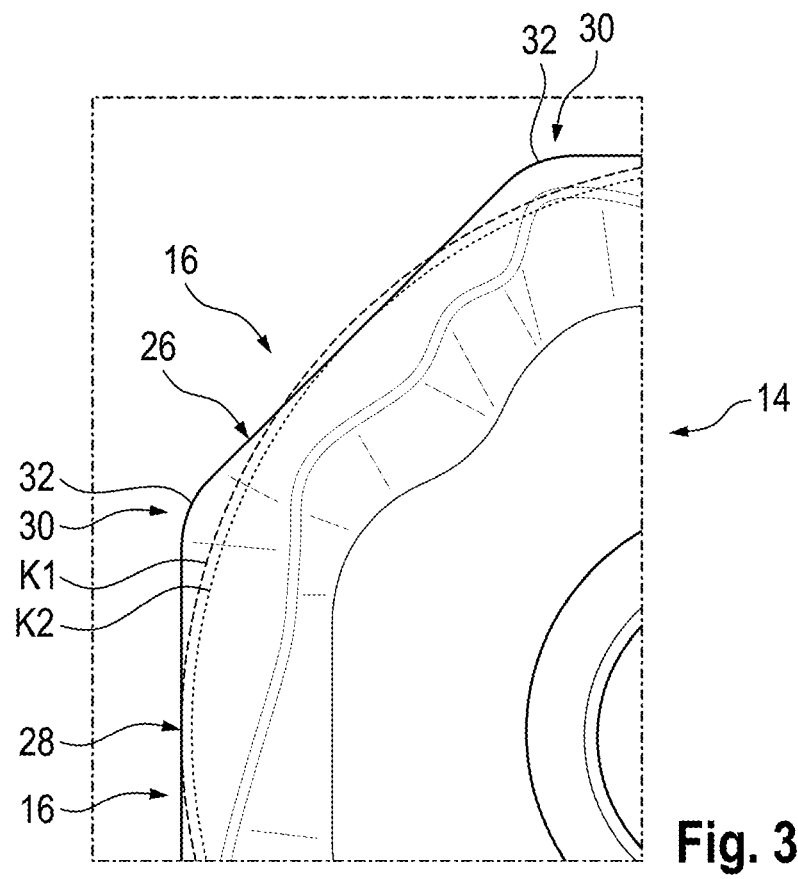

FIG. 1 shows a cutting tool 10, which here is configured as a milling tool. It comprises a tool body 12 to which a cutting insert 14 is attached. The cutting tool 10 can, of course, also include other cutting inserts. However, these are not shown.

For precise positioning of the cutting insert 14, said cutting insert abuts respective associated counter-abutment surfaces 18*a*, 18*b* of the tool body 12 with two of its lateral surfaces 16, which are identified as 16*a* and 16*b*.

The lateral surfaces 16 identified as 16*a* and 16*b* are therefore abutment surfaces for the abutment of the cutting insert 14 against the tool body 12.

The cutting insert can furthermore be attached to the tool body via the opening 19 using a not more closely depicted screw.

The shown cutting insert 14 is octagonal.

It therefore has a polygonal upper side 20 having eight corners. A lower side 22 is octagonal as well.

The upper side 20 and the lower side 22 are congruent when viewed along a center axis of the cutting insert 24.

The cutting insert accordingly has a total of eight lateral surfaces 16, but only two of them are used as abutment surfaces (see above).

Each lateral surface 16 connects an edge of the upper side 20 to an edge of the lower side 22 that is adjacent along the center axis of the cutting insert 24.

The lateral surfaces 16 are continuous along the center axis of the cutting insert 24; i.e. configured without steps, shoulders or the like.

Cutting edges are also configured on the edges of the upper side 20, i.e. at the transition between the upper side 20 and the associated lateral surfaces 16, whereby said cutting edges are alternating roughing cutting edges 26 and finishing cutting edges 28.

The same applies to the lower side 22. Here, too, alternating roughing cutting edges 26 and finishing cutting edges 28 are provided.

On both the upper side 20 and the lower side 22, the finishing cutting edges 28 define an incircle K1 and the roughing cutting edges 26 define an incircle K2. A diameter of the incircle K1 is enlarged in comparison to a nominal size of the cutting insert 14 and a diameter of the incircle K2 is reduced in comparison to the nominal size of the cutting insert 14.

The roughing cutting edges 26 and the finishing cutting edges 28 are thus disposed on different incircles.

With respect to the roughing cutting edges 26 and the finishing cutting edges 28, the lateral surfaces 16 all form free surfaces.

Associated rake faces are provided on the upper side 20 and the lower side 22 respectively.

The roughing cutting edges 26 provided on the upper side 20 are furthermore concave and the finishing cutting edges 28 provided on the upper side 20 are inclined at a constant angle of approx. 10° relative to the upper side 20. The roughing cutting edges 26 therefore initially fall from a first corner of the cutting insert delimiting them in the direction of the center of the cutting insert and then rise again in the direction of the second corner delimiting them.

The same applies to the roughing cutting edges 26 and finishing cutting edges 28 provided on the lower side 22.

Figure 4:
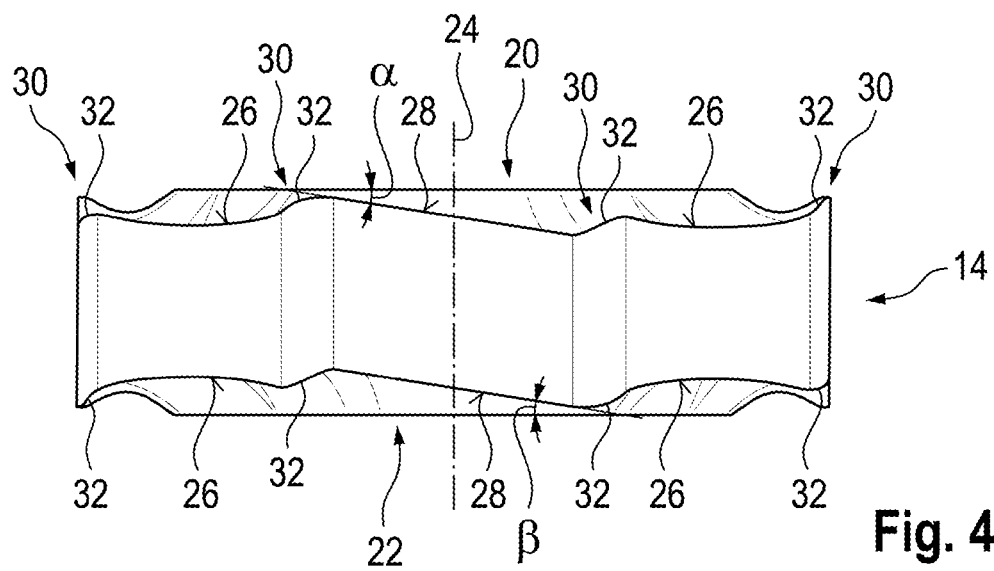

As an example in FIG. 4, the angle at which the frontally depicted finishing cutting edge 28 provided on the upper side 20 is inclined is $\alpha$ and the angle at which the likewise frontally depicted finishing cutting edge 28 provided on the lower side 22 is inclined is $\beta$.

The angles at which the remaining finishing cutting edges 28 and roughing cutting edges 26 are inclined with respect to the upper side 20 and the lower side 22 are measured in a similar manner.

It goes without saying that this angle is variable over the extent of convex or concave finishing cutting edges 28 or roughing cutting edges 26.

In order to be able to ensure a continuous peripheral edge of the upper side 20 and the lower side 22 despite the inclination of the finishing cutting edges 28 and the concavity of the roughing cutting edges 26, a connecting edge 32 for the cutting edges of the upper side 20 and a connecting edge 32 for the cutting edges of the lower side 22 is provided in each corner region 30 of the cutting insert 14.

The connecting edge 32 continuously connects respective adjacent roughing cutting edges 26 and finishing cutting edges 28.

The invention claimed is:

1. A cutting insert comprising:
   a polygonal upper side and a polygonal lower side, wherein the upper side and the lower side are congruent when viewed along a center axis of the cutting insert, with a number of lateral surfaces which corresponds to the number of corners of the upper side, wherein each of the lateral surfaces connects an edge of the upper side to an edge of the lower side that is adjacent along the center axis of the cutting insert,
   with a number of cutting edges which corresponds to the number of corners of the upper side, wherein the cutting edges are provided on the edges of the upper side and are alternately configured as roughing cutting edges and finishing cutting edges, and wherein the lateral surfaces are continuous along the center axis of the cutting insert, and
   the finishing cutting edges define an incircle (K1) having a diameter that is enlarged in comparison to a nominal size of the cutting insert, and the roughing cutting edges define an incircle (K2) having a diameter that is reduced in comparison to the nominal size of the cutting insert.

2. The cutting insert according to claim 1, wherein cutting edges are provided on the edges of the lower side, wherein the cutting edges are alternately configured as roughing cutting edges and finishing cutting edges and similar cutting edges are disposed adjacent to one another along the center axis of the cutting insert.

3. The cutting insert according to claim 1, wherein the cutting edges configured as roughing cutting edges are inclined, convex or concave with respect to the upper side or the lower side.

4. The cutting insert according to claim 1, wherein the cutting edges configured as finishing cutting edges are inclined, convex or concave with respect to the upper side or the lower side.

5. The cutting insert according to claim 3, wherein, at least in sections, the cutting edges configured as roughing cutting edges and/or the cutting edges configured as finishing cutting edges are inclined at an angle of 3° to 20° relative to the upper side or the lower side.

6. The cutting insert according to claim 3, wherein a connecting edge is provided on the upper side and the lower side in each corner region of the cutting insert which continuously connects adjacent cutting edges.

7. The cutting insert according to claim 3, wherein the cutting edges configured as finishing cutting edges are more inclined than the cutting edges configured as roughing cutting edges.

8. The cutting insert according to claim 1, wherein the lateral surfaces which are associated with the finishing cutting edges are abutment surfaces for abutment of the cutting insert against a tool body.

9. The cutting insert according to claim 1, wherein the lateral surfaces are free surfaces of the adjacent cutting edges.

10. The cutting insert according to claim 1, having an even number of corners.

11. The cutting insert according to claim 10, having four, six, or eight corners.

12. The cutting tool of claim 5, wherein the angle is 5° to 15°.

13. The cutting tool of claim 1, wherein the cutting tool is a milling tool.

14. A cutting tool comprising a tool body on which at least one cutting insert according to claim 1 is disposed.

15. The cutting tool according to claim 14, characterized in that at least one lateral surface of the cutting insert which is associated with one of the finishing cutting edges abuts a counter-abutment surface of the tool body.

* * * * *